(12) United States Patent
Mendezmonsanto

(10) Patent No.: US 11,134,799 B1
(45) Date of Patent: Oct. 5, 2021

(54) SNAP FASTENER SET FOR HANGING OBJECTS

(71) Applicant: Gabriel Mendezmonsanto, Miami, FL (US)

(72) Inventor: Gabriel Mendezmonsanto, Miami, FL (US)

( * ) Notice: Subject to any disclaimer, the term of this patent is extended or adjusted under 35 U.S.C. 154(b) by 0 days.

(21) Appl. No.: 16/892,144

(22) Filed: Jun. 3, 2020

(51) Int. Cl.
*A47G 1/16* (2006.01)
*F16B 21/07* (2006.01)

(52) U.S. Cl.
CPC .......... *A47G 1/1606* (2013.01); *F16B 21/073* (2013.01)

(58) Field of Classification Search
CPC .............................. A47G 1/1606; F16B 21/073
USPC ................................................ 248/475.1, 466
See application file for complete search history.

(56) References Cited

U.S. PATENT DOCUMENTS

| | | | | |
|---|---|---|---|---|
| 1,149,141 | A * | 8/1915 | Hook | A47G 1/1606 248/489 |
| 3,812,757 | A * | 5/1974 | Reiland | F16B 31/021 411/5 |
| 4,267,870 | A * | 5/1981 | Warner | F16B 39/101 411/122 |
| 2011/0191990 | A1* | 8/2011 | Beaulieu | F16B 21/073 24/457 |
| 2014/0101913 | A1* | 4/2014 | Roddenberry | F16M 13/02 29/428 |
| 2014/0144005 | A1* | 5/2014 | Hobday | F16B 21/073 29/525.03 |
| 2018/0149191 | A1* | 5/2018 | Spitzer | B29C 65/76 |

* cited by examiner

*Primary Examiner* — Muhammad Ijaz
(74) *Attorney, Agent, or Firm* — Ruben Alcoba, Esq.

(57) ABSTRACT

A snap fastener set has at least one female socket element that is secured to solid surface and at least one stud, that is affixed to an object, that has a hemispherical end that inserts within the at least one female socket. The at least one hemispherical end that has an apex that is conically shaped that is used to mark an indentation on the solid surface in which the female socket element will be secured. The snap fastener set is used to hang pictures, mirrors or object on solid surfaces.

10 Claims, 4 Drawing Sheets

STEP 1

STEP 2

STEP 3

STEP 4

Step 1

Step 2

Step 3

Step 4

SNAP FASTENER SET FOR HANGING OBJECTS

BACKGROUND

Figure 1:
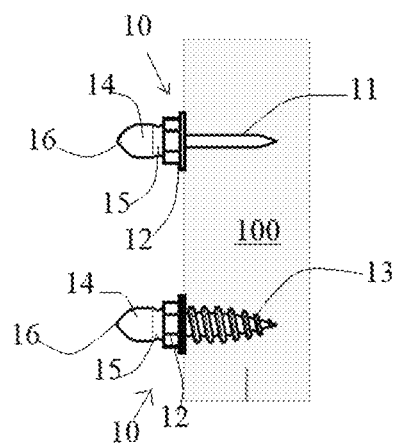
Figure 1:
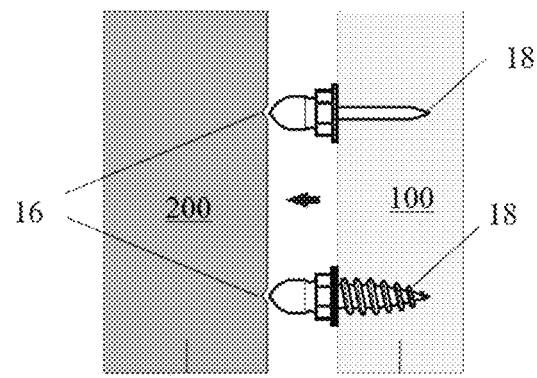
Figure 1:
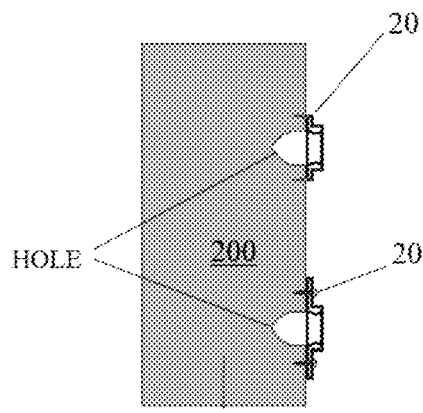
Figure 1D:
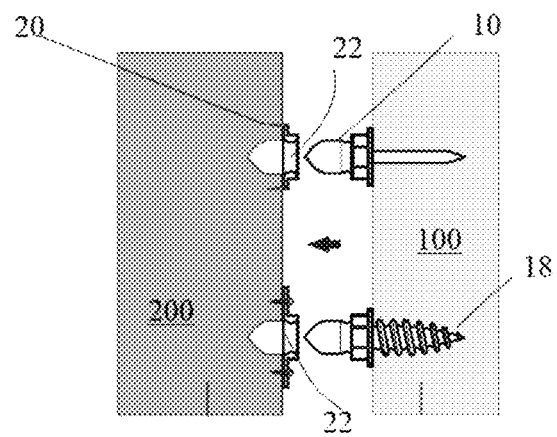

The present invention is directed to a snap fastener set for hanging objects on solid surfaces.

Presently, pictures or minors are hung using cords that are secured to the back of the pictures, mirrors or objects at two distinct points and the cords are made to rest over a hook, screw or nail that is secured to wall.

Another manner in which pictures, mirrors or objects are hung is by securing at least on plate that has a grasping or hooking means on the pack of the picture, the mirror or object and then resting the grasping or hooking means on a protruding object that is on a wall.

There are other methods of securing pictures, mirrors or objects on vertical walls, the problem with most of these methods is that it takes at least two people to try to attempt to hang the pictures or the mirrors on the walls.

Usually, to hang pictures, mirrors or objects on walls, the walls must be marked by a marking means. When hanging larger pictures, mirrors or objects on walls, normally two people are required.

The present invention allows a single person to mark a wall while positioning a picture, a mirror or an object on the wall. The snap fastener set of the present invention has a hemispherical end that is conically shaped to leave an indentation on the spot of the wall in which a snap anchor or socket will be anchored.

The snap anchor or socket is a female element of the present invention and a stud's hemispherical end is the male element of the present invention. The present invention works by inserting the stud's hemispherical end within the female element of the snap anchor or socket. For the present invention to work correctly, the stud must be firmly secured to the back of a picture or a mirror.

The present invention eliminates many of the complications experienced when hanging objects on vertical walls or solid vertical surfaces. It does this by providing a snap fastener set that does not require two installers.

The snap fastener set of the present invention eliminates the need of having two people position and nark the place in which a picture or a mirror will be hung.

SUMMARY

The present invention is a snap fastener set for hanging an object on a solid surface.

The snap fastener set has at least one female socket nail plate that is secured to a solid surface and at least one stud that has a hemispherical end, the at least one stud is thinly attached to the back of a picture, a mirror frame or an object, that inserts within the at least one female socket. An apex of the at least one hemispherical end is conically shaped and is used to mark the solid surface.

The present invention is used by first attaching the at least one stud to the back of an object. Then positioning the object at a surface location wherein the object is to be hung. Next, pressing the object on the surface location so that the conically shaped apex of the at least one hemispherical end leaves an at least one indentation on the surface location. Then, drilling a hole at the least one indentation. Next, attaching the at least one female socket nail plate to the at least one indentation of the surface location. And Lastly, inserting the hemispherical end of the at least one stud within a flexible socket of the at least one female socket nail plate The at least one stud of the present invention can be a nail or a screw.

The at least one female socket plate of the present invention can have a variety of attachment means, for example, a nail plates, screws or anchors.

An object of the present invention is to provide a snap fastener set for hanging an object on a solid surface.

Another object of the present invention is to provide a snap fastener set that will allow a person to hang an object on a solid surface without the need of an assistant.

Yet another object of the present invention is to provide a snap fastener set that will allow a user to visually locate the placement of an object on a solid surface without the need of distance measuring.

Yet still another object of the present invention is to provide a snap fastener set that can be used to mark the placement of an object on a solid surface.

A further object of the present invention is to provide a snap fastener set that can be used to secure an object on a solid surface.

DRAWINGS

Figure 2:
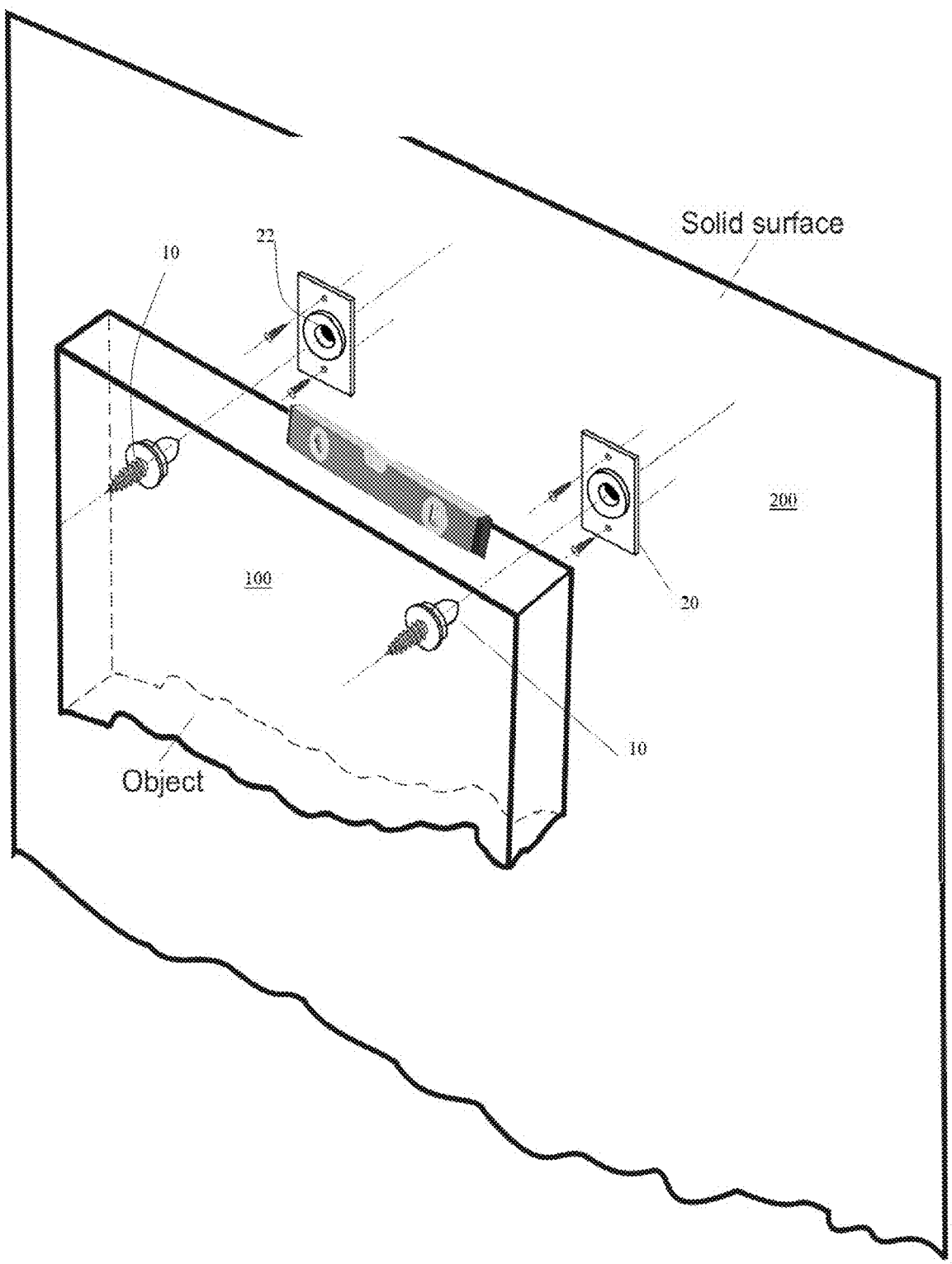
Figure 3:
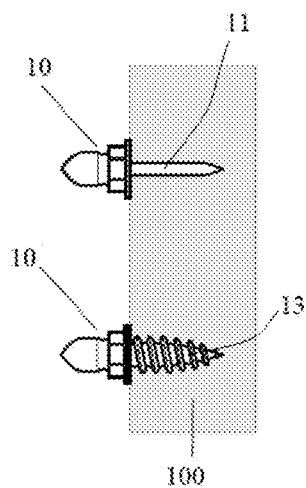
Figure 3:
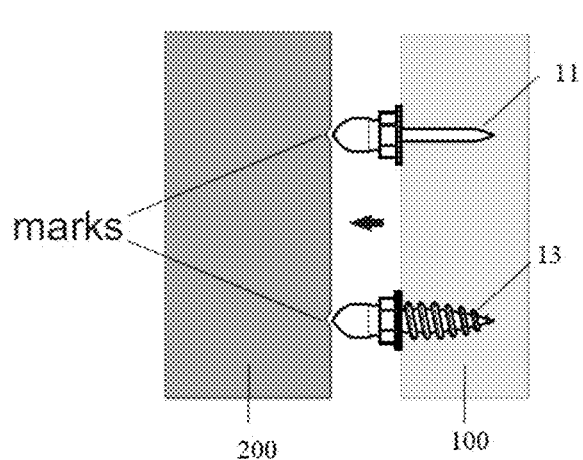
Figure 3:
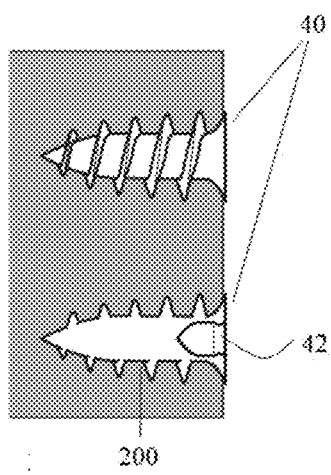
Figure 3:
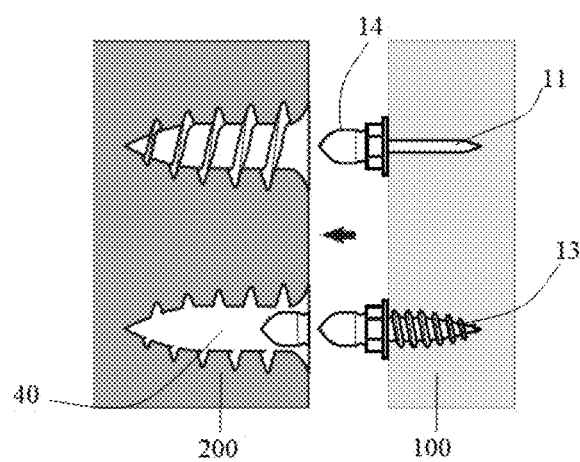
Figure 4:
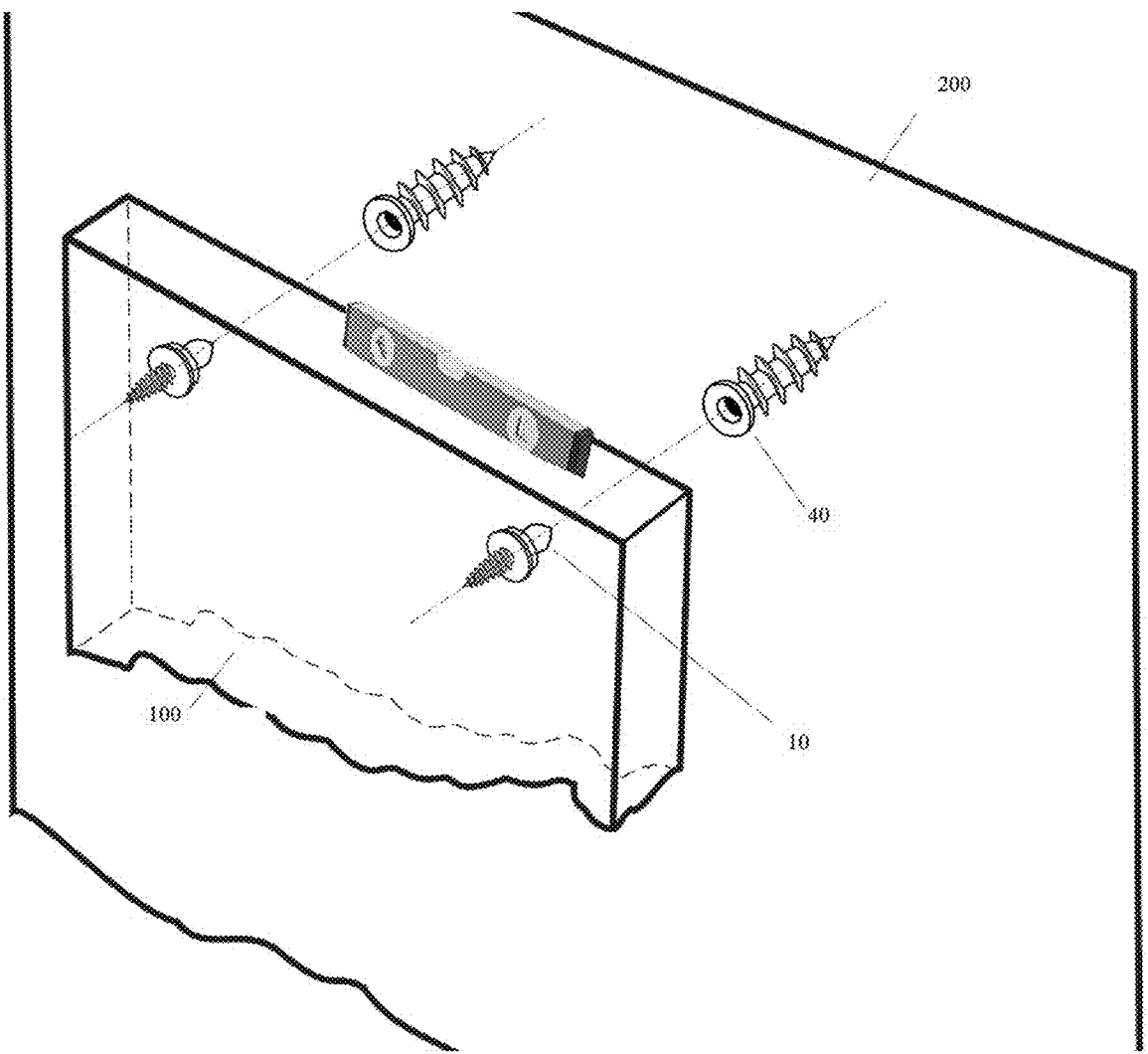

These and other features, aspects, and advantages of the present invention will become better understood with regards to the following description, appended claims, and drawings where:

FIG. 1(a)-FIG. 1(d) shows a four-step process of how an embodiment of the present invention is secured to an object and a solid surface;

FIG. 2 shows a perspective view of the embodiment disclosed in FIG. 1;

FIG. 3 (a)-FIG. 3 (d) shows a four-step process of how a second embodiment of the present invention is secured to an object and a solid surface or a wall; and FIG. 4 shows a perspective view of the embodiment disclosed in FIG. 3.

DESCRIPTION

As seen in FIGS. 1-4, the present invention is a snap fastener set for hanging an object on a solid surface.

As seen in FIGS. 1 and 2, in an embodiment of the present invention, the snap fastener set comprises of at least one stud 10 that defines a fixed nut 12 and a hemispherical end comprising a cylindrical portion 14 and a stud anchor 18, a circumferential groove 15 is defined on the cylindrical portion 14 at a position that is adjacent to the fixed nut 12, a pointed end 16 is defined on the hemispherical end that is configured to mark a solid surface 200, the stud anchor 18 is configured to be inserted into an object 100, after the stud anchor 18 is inserted into the object 100, the object 100 is pressed onto the solid surface 200 to create a mark on the solid surface 200. And, at least one socket member comprising a nail plate 20 and a hemispherical socket 22, wherein a longitudinal length of said at least one hemispherical socket 22 is substantially equal to a length of said hemispherical end 14 of the at least one stud 10, the at least one socket nail plate 20 is configured to be secured on the mark that is on the solid surface 200.

In embodiments of the present invention, the stud anchor 18 can either be a nail 11 or a screw.

The object 100 in which the studs 11, 13 are inserted into can either be the back of a picture frame or the back of a mirror frame.

As Seen in FIGS. 3 and 4, in an embodiment of the present invention, the invention will use at least one screw anchor 40 that defines a hemispherical socket 42 rather than the at least one socket nail plate 20 that defines a hemispherical socket 22. The hemispherical socket 42 is fabricated so that it bends and returns to its original position during the snapping action that will occur when the hemispherical end 14 of the stud 19 in inserted within the hemispherical socket 42. In some embodiments the at least one screw anchor 40 will be screw shaped.

An advantage of the present invention is that it provides a snap fastener set for hanging an object on a solid surface Another advantage of the present, invention is that it provides a snap fastener set that allows a person to hang an object on a solid surface without the need of an assistant.

Yet another advantage of the present invention is that it provides a snap fastener set that allows a user to visually locate the placement of an object on a solid surface without the need of distance measuring.

Yet still another advantage of the present invention is that it provides a snap fastener set that is used to mark the placement of an object on a solid surface.

A further advantage of the present invention is that it provides a snap fastener set that is used to secure an object on a solid surface.

The snap fastener set for hanging pictures or mirrors on walls described herein are exemplary and numerous modifications, combinations, variations, and rearrangements can be readily envisioned to achieve an equivalent result, all of which are intended to be embraced within the scope of the appended claims. Further, nothing in the above-provided discussions of snap fastener sets should be construed as limiting the invention to an embodiment or a combination of the embodiments. The scope of the invention is defined by the description, drawings, and appended claims.

What is claimed is:

1. A snap fastener set for hanging an object on a solid surface, the snap fastener set comprises:
    at least one stud that defines a fixed nut and a hemispherical end comprising a cylindrical portion and a stud anchor, a circumferential groove is defined on the cylindrical portion at a position that is adjacent to the fixed nut,
    a pointed end is defined on the hemispherical end that is configured to mark on the solid surface, the stud anchor is configured to be inserted into the object after the stud anchor is inserted into the object the object is pressed onto the solid surface to create a mark on the solid surface; and
    at least one socket member comprising a nail plate and a hemispherical socket wherein a longitudinal length of said at least one socket member is substantially equal to a length of said hemispherical end of the at least one stud, wherein the said hemispherical end is configured to snap fit to said hemispherical socket, wherein the socket nail plate is configured to be secured on the mark that is on the solid surface.

2. The snap fastener set for hanging an object on a solid surface of claim 1, wherein said at least one stud is a nail.

3. The snap fastener set for hanging an object on a solid surface of claim 2, wherein the object is a picture frame.

4. The snap fastener set for hanging an object on a solid surface of claim 2, wherein the object is a mirror frame.

5. The snap fastener set for hanging an object on a solid surface of claim 1, wherein said at least one stud is a screw.

6. The snap fastener set for hanging an object on a solid surface of claim 5, wherein the object is a picture frame.

7. The snap fastener set for hanging an object on a solid surface of claim 5, wherein the object is a mirror frame.

8. A snap fastener set for hanging an object on a solid surface, the snap fastener set comprises:
    at least one screw stud that defines a fixed nut, a hemispherical end comprising a cylindrical portion and a stud anchor, a circumferential groove is defined on the cylindrical portion at a position that is adjacent to the fixed nut, a pointed end is defined on the hemispherical end that is configured to a mark the solid surface, the stud anchor is configured to be inserted into the object, such that after the stud anchor is inserted into the object, the object is pressed onto the solid surface to create the mark on the solid surface; and
    at least one anchor that defines a hemispherical socket, wherein a longitudinal length of said anchor is substantially equal to a length of said hemispherical end of the at least one screw stud, wherein the said hemispherical end is configured to snap fit to said hemispherical socket, wherein the at least one anchor is configured to be secured into the solid surface.

9. The snap fastener set for hanging an object on a solid surface of claim 8, wherein the object is a picture frame.

10. The snap fastener set for hanging an object on a solid surface of claim 8, wherein the object is a mirror frame.

\* \* \* \* \*